Patented Aug. 19, 1924. 1,505,236

UNITED STATES PATENT OFFICE.

LORIN H. BAILEY, OF WASHINGTON, DISTRICT OF COLUMBIA, DEDICATED, BY MESNE ASSIGNMENTS, TO THE CITIZENS OF THE UNITED STATES OF AMERICA.

MANUFACTURE OF LEAVENED BREAD.

No Drawing. Application filed May 7, 1924. Serial No. 711,543.

(FILED UNDER THE ACT OF MARCH 3, 1883, 22 STAT. L., 625.)

*To all whom it may concern:*

Be it known that I, LORIN H. BAILEY, a citizen of the United States, and an employee of the United States Department of Agriculture, residing in Washington, District of Columbia, have invented certain new and useful Improvements in the Manufacture of Leavened Bread, of which the following is a specification.

This application is made under the act of March 3, 1883, Chapter 143 (22 Stat. 625) and the invention herein described and claimed may be used by the Government of the United States or any of its officers or employees in the prosecution of work for the Government, or any person in the United States, without payment to me of any royalty thereon.

The present invention relates to certain new and useful improvements in the manufacture of leavened bread and rolls.

The invention is based upon the discovery that the use of cocoa, when used as a flavoring material in the manufacture of leavened bread, tends to produce a loaf that has improved keeping qualities, i. e., it remains in a fresh state longer than ordinary bread when kept under the same conditions. Other qualities of the loaf such as volume, texture or grain, and elasticity are not materially altered. The color, however, is dark brown. The flavor is pronouncedly that of cocoa. Variations in the flavor may be made by the addition of raisins, peanuts, etc.

Since cocoa alone imparts a slightly bitter taste to the bread, it is necessary to add additional sweetening to overcome this bitterness. For this purpose, there may be used sugar (sucrose), maltose, honey, etc. The amount of additional sweetening to be added may be determined by individual desires, but an amount equal to the weight of the cocoa used has been found satisfactory.

In making leavened cocoa bread and rolls, the cocoa is substituted for wheat flour to the extent of eight or ten per cent of its weight, additional sweetening of the kind and amount desired is added. The ordinary methods and procedure used in making plain bread and rolls or raisin bread and rolls may be used in making the cocoa products.

I claim:

In the manufacture of leavened bread the step of incorporating cocoa in the dough batch to act as a flavoring agent and to improve the keeping qualities of the bread.

LORIN H. BAILEY.